Sept. 15, 1970   R. GOLDSTEIN   3,529,183
COMPLEMENTARY TRANSISTOR CONTROL CIRCUIT
Filed May 27, 1968   4 Sheets-Sheet 1

Inventor
Richard Goldstein
By: Wallenstein, Spangenberg, Hattis & Strampel
attys.

Inventor
Richard Goldstein
By Wallenstein, Spangenberg, Hattis & Strampel
attys

Inventor
Richard Goldstein

Figures 3A, 3B:
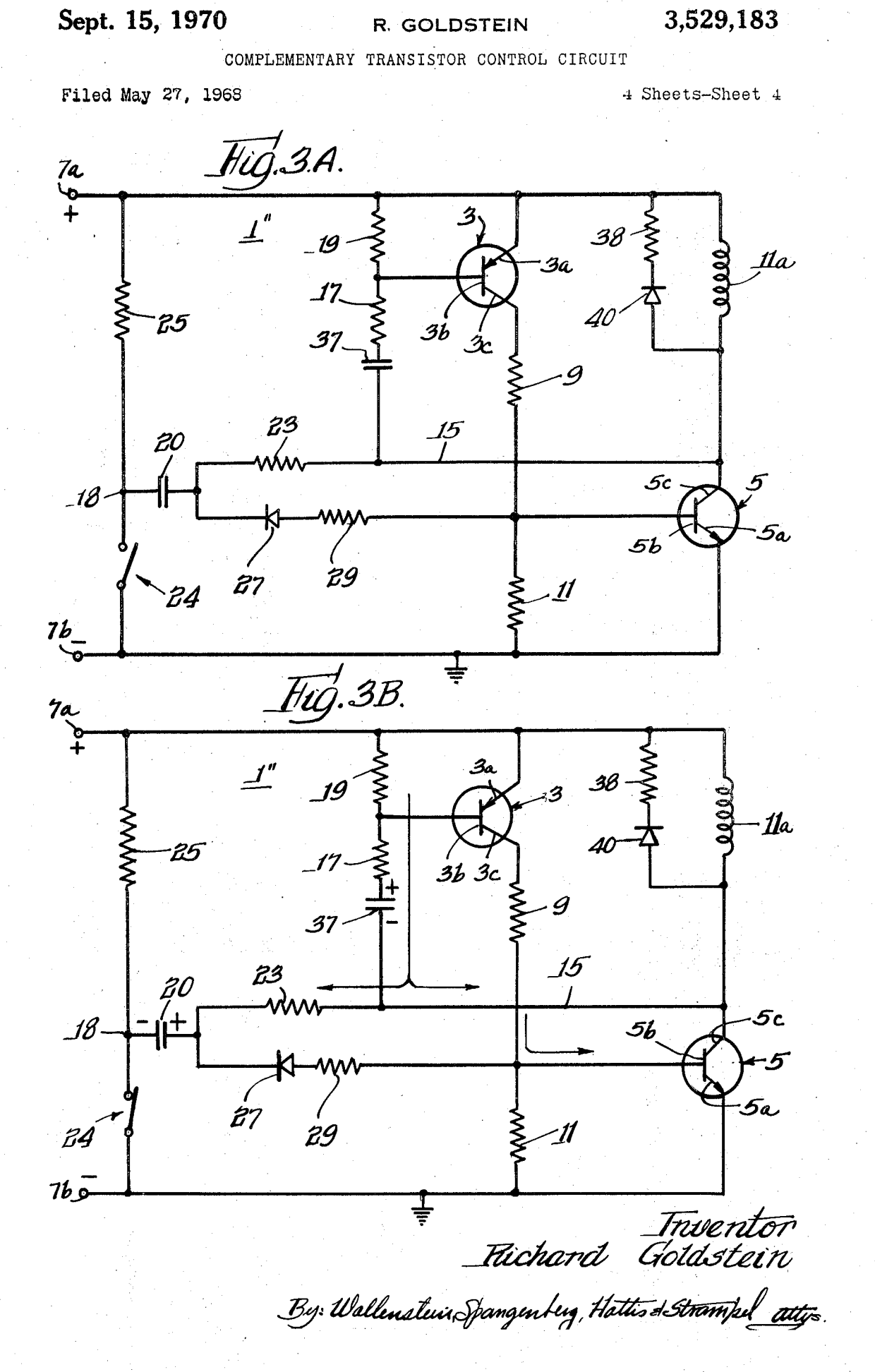

Sept. 15, 1970     R. GOLDSTEIN     3,529,183
COMPLEMENTARY TRANSISTOR CONTROL CIRCUIT
Filed May 27, 1968     4 Sheets-Sheet 4

Inventor
Richard Goldstein
By: Wallenstein, Spangenberg, Hattis & Strampel attys.

United States Patent Office 3,529,183
Patented Sept. 15, 1970

3,529,183
COMPLEMENTARY TRANSISTOR CONTROL CIRCUIT
Richard Goldstein, Deerfield, Ill., assignor to Chamberlain Manufacturing Corporation, Elmhurst, Ill., a corporation of Iowa
Filed May 27, 1968, Ser. No. 732,115
Int. Cl. H03k 3/00
U.S. Cl. 307—288                    9 Claims

ABSTRACT OF THE DISCLOSURE

A complementary transistor circuit operated by successive uni-polarity signals which, in the bistable embodiment of the invention, alternately render the transistors simultaneously conductive and non-conductive by virtue of a unique combination of capacitor charge and discharge circuits which charge the capacitor in one direction during the initial signal through the base circuit of one of the transistors to trigger the same into conduction, and which render the other transistors conductive, discharge and reverse charge of the capacitor when the initial signal disappears, and then discharges the capacitor through a rectifier isolated circuit coupled to the base circuit of said other transistor during the next signal to trigger first said other and then said one transistor into non-conduction.

---

This invention relates to complementary transistor circuits which form bistable and monostable circuits.

Bistable circiuts have been formed by complementary transistors located in parallel branch circuits coupled across a source of D.C. voltage, the base of each transistor being connected to the collector of the other transistor to provide cross coupled, positive feedback connections therebetween. The present invention provides such a complementary transistor circuit, among other things, which has the advantages over prior circuits of this type that it can be made with fewer parts at decreased cost and with increased reliability. Also, the circuit provides a maximum circuit flexibility for applications requiring multiple control inputs. In its most preferred form, the circuit can be externally triggered to its conducting and non-conducting modes by successive application of uni-polarity signals to the same input terminal. The preferred circuit of the invention is particularly useful as a relay driving circuit because the inductance of a relay coil forms an active switching element and a load impedance of one of the complementary transistors and so takes the place of a load resistor. Conventional complementary transistor circuits require pulse steering circuits including a pair of rectifiers and associated resistors for successively rendering the complementary transistors conductive and non-conductive from uni-polarity pulses fed to the same input terminal. The present invention provides a circuit where successive uni-polarity pulses operate the circuit in this manner but without the need of steering rectifiers. The circuit of the present invention is also operable without the aforementioned relay coil or inductance.

Exemplary embodiments of the invention will be shown and described in the specification and claims to follow and in the drawings wherein:

FIG. 3A is a complementary transistor monostable circuit incorporating features of the invention; and FIG. 3B shows the transient current flowing in the circuit of FIG. 3A during application of a turn-on control signal to the input of the circuit of FIG. 3A.

Figure 1A:
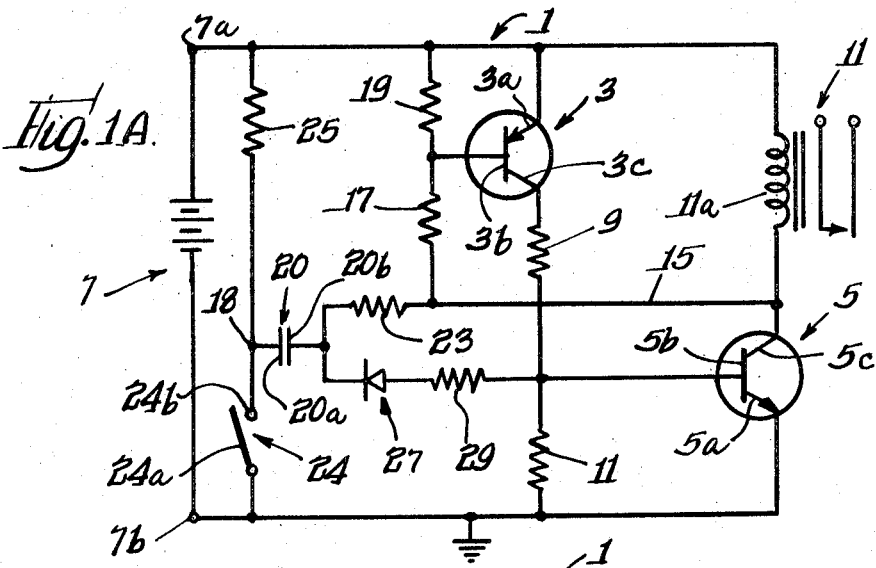
FIG. 1A is a complementary transistor bistable relay driver circuit incorporating features of the invention.

Refer now to FIGS. 1A through 1E which show a complementary transistor bistable circuit generally indicated by reference numeral 1. This circuit includes a PNP transistor 3 having an emitter 3a, base 3b and collector 3c and a NPN transistor 5 having an emitter 5a, base 5b and collector 5c. The PNP transistor 3 forms part of a first branch circuit connected across the positive and negative terminals 7a and 7b of a source of D.C. voltage 7, and the NPN transistor 5 forms part of a second branch circuit in parallel with the first mentioned branch circuit across the voltage source terminals 7a and 7b. The emitter 3a of the transistor 3 is connected to the positive voltage source terminal 7a, and the collector 3c is connected to a resistor 9, in turn, connected to a resistor 11 which completes the first mentioned branch circuit. (The resistors 9 and 11 are sometimes referred to as load impedance means.) The second mentioned branch circuit includes a second load impedance means which, in the embodiment of the invention now being described is a coil 11a of a relay 11. One end of the relay coil 11a is connected to the voltage source terminal 7a and the other end is connected to the collector 5c of the transistor 5. The emitter 5a of the transistor 5 is connected to the negative voltage source terminal 7b which is shown grounded.

The base 5b of the transistor 5 is connected to the load impedance means of the transistor 3 so that conduction of the transistor 3 will effect conduction of the transistor 5. In the circuit illustrated' the base 5b is connected to the juncture of resistors 9 and 11. Once the transistor 5 becomes conductive, the conduction of the transistor 3 is maintained by the connection from the collector 5c of the transistor 5 to the base to emitter circuit of the transistor 3. To this end, a conductor 15 extends between the collector 5c and one end of a current limiting resistor 17 whose other end is connected to the base 3b of the transistor 3. To improve the reliability of the circuit and the thermal stability of the transistor 3, a resistor 19 is preferably connected between the base 3b and the emitter 3b of the transistor 3. When the transistor 5 becomes conductive, the transistor 3 receives drive power through a circuit extending through the resistor 17 and the emitter and collector of the transistor 5.

The various features of the present invention deal with unique control circuitry which normally maintains the transistors 3 and 5 in non-conductive states when power is initially applied to the circuit, subsequently triggers the transistors 3 and 5 into simultaneously conducting states upon the presence of a momentary pulse or signal at an input terminal 18, and then subsequently returns the transistors to their non-conducting states upon momentary re-appearance of a pulse or signal of the same polarity at the input terminal 18. In the preferred form of the invention shown in FIGS. 1A through 1E, this control circuitry includes a capacitor 20 having one plate 20a preferably connected directly to the input terminal 18 and another plate coupled to the positive voltage source 7a through the base circuit of the transistor 3. To this end, a resistor 23 is shown connected between the other plate 20b of the capacitor and the end of the aforesaid resistor 17 connected to the conductor 15 extending to the collector 5c of the transistor 5. Although in some cases the resistor 23 may be eliminated completely, the resistor 23 is preferably present for a number of reasons including the isolation of capacitor 20 from the collector 5c of the transistor 5.

The signal fed to the input terminal 18 is preferably generated by the momentary closure of a switch 24 which may comprise mechanical contacts 24a and 24b as illustrated or an electronic switch which can connect the input terminal 18 to the grounded negative voltage source terminal 7b. When the input terminal 18 is grounded by the circuit described, a charge path is established for the capacitor 20 extending through resistors 23, 17 and 19, as best illustrated in FIG. 1B, where the plate 20b of the capacitor 20 will be positive with respect to the other plate 20a. The flow of this charging current through resistor 19 develops a drive voltage for transistor 3 which triggers it into conduction. The resulting current flow will generate a positive voltage across resistor 11 coupled to the base 5b of transistor 5 to trigger it into conduction.

Figure 1B:
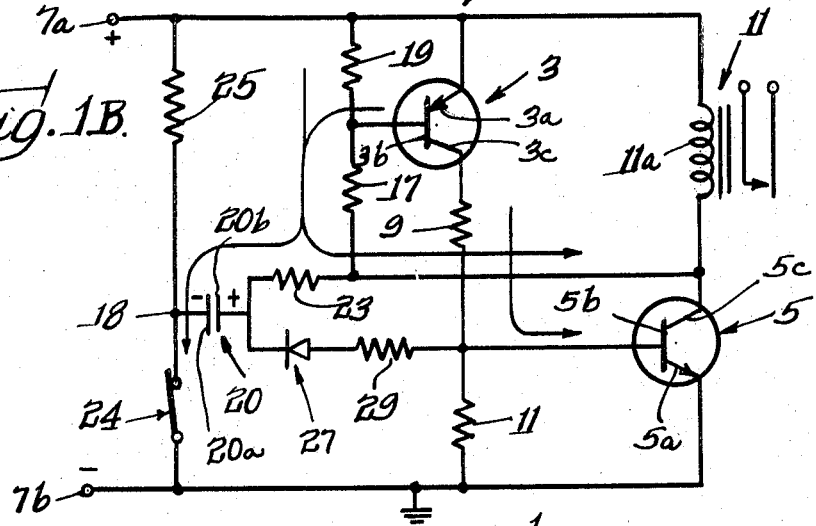
FIG. 1B shows the transient currents flowing in the circuit of FIG. 1A during the momentary application of a control signal to the input thereof.
Figure 1C:
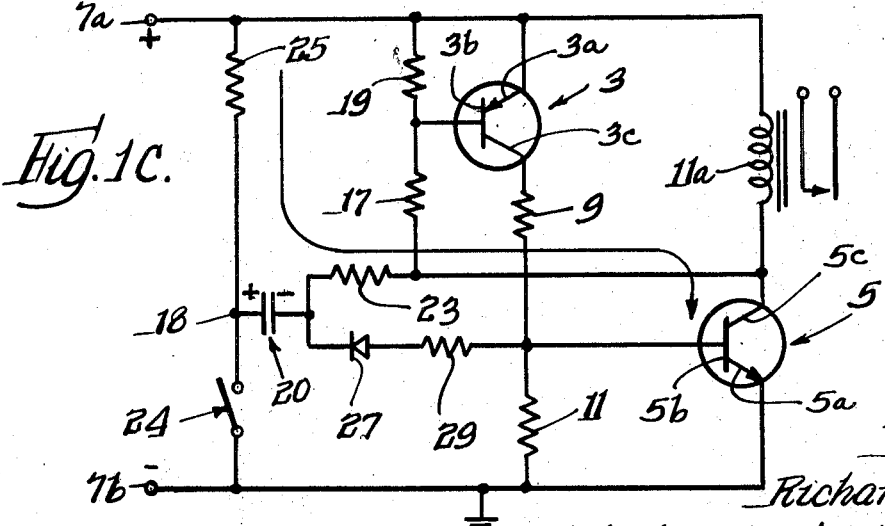
FIG. 1C shows the transient current flowing in the circuit of FIG. 1A when the control signal applied in FIG. 1B disappears.
Figure 1D:
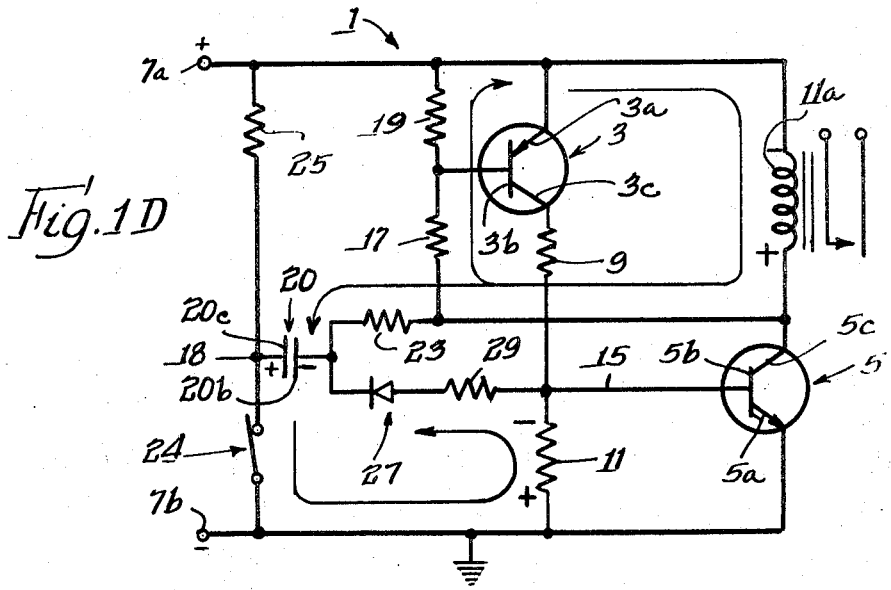
FIG. 1D shows the transient currents flowing in the circuit of FIG. 1A at the instant the next control signal is applied to the input of the circuit of FIG. 1C.
Figure 1E:
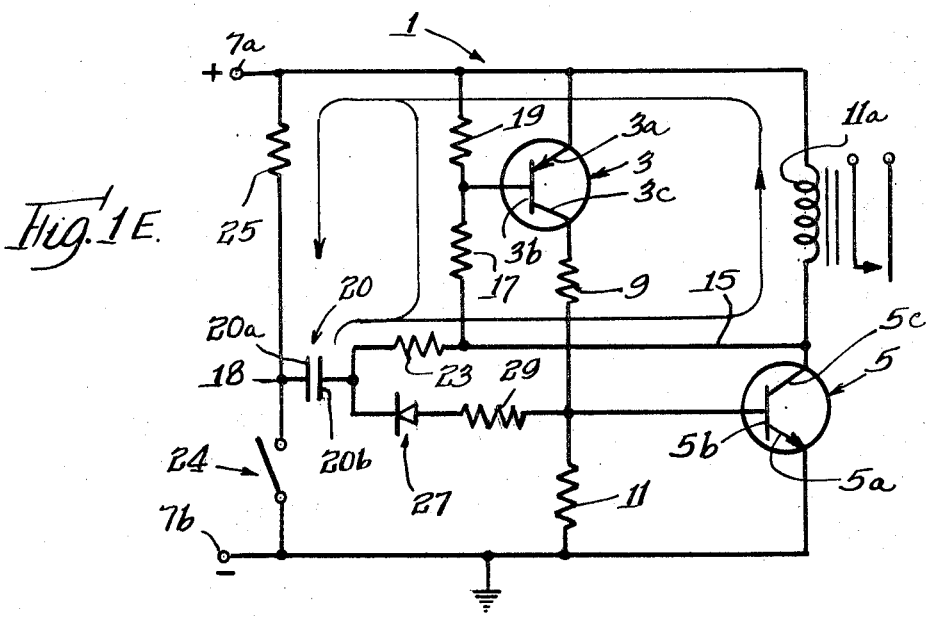
FIG. 1E shows the transient currents flowing in the circuit of FIG. 1A at the instant the last mentioned control signal disappears.

When ground is removed from the input terminal 18 upon the opening of the switch 24, a discharge path for the capacitor 20 is established shown in FIG. 1C through a circuit including a resistor 25 connected between the input terminal 18 and the positive voltage source terminal 7a. This discharge path also extends through resistor 23 and the collector 5c and emitter 5a of the then conducting transistor 5. The capacitor 20 then discharges and recharges to a voltage where the plate 20a connected to the input terminal 18 will be positive with respect to the plate 20b. With this reverse charge condition of the capacitor 20, the subsequent reclosure of the switch 24 establishes a discharge circuit for the capacitor 20 which drives the transistor 5 to its non-conducting condition. This discharge path includes a rectifier 27 oriented only to pass a negative voltage, and a resistor 29 connected between the rectifier 27 and the ungrounded end of the load resistor 11 connected to the base 5b of the transistor 5. Thus, upon reclosure of the switch 24, the capacitor 20 discharges through the rectifier 27, resistor 29 and resistor 11, as shown in FIG. 1D, to generate a negative voltage across the resistor 11 to render the transistor 5 non-conductive. The rectifier 27 also serves the function of isolating the base of the transistor 5 from the positive voltage source terminal 7a to prevent turn-on of the transistor 5 when power is initially applied to the circuit.

When the transistor 5 is rendered non-conductive, the sudden cessation of current flow through the transistor 5 will result in the generation of a relatively high voltage across the inductive load (relay coil 11a) of the transistor 5 which causes current to flow through the resistors 17 and 19 in the base circuit of transistor 3 which renders the transistor 3 non-conductive. It should be noted that the capacitor 20 has a possible charge path through resistors 17 and 19 during the second closure of switch 24 which, if such path were allowed to be established, would generate a turn-on voltage for the transistor. The voltage across the inductive load 72 prevents the establishment of this circuit when transistor 5 is triggered into its non-conductive state and the time constant of the inductive circuit must be such as to prolong this inhibiting voltage until capacitor 20 becomes substantially fully charged through a D.C. path including the inductive load 11a as shown in FIG. 1D. The resistor 23, the inductance of the load 11a and the D.C. resistance of the load determine the time constant of the inductive circuit.

When the switch 24 reopens for the second time, capacitor 20 will discharge to zero volts since there is then no ground return to the capacitor.

Figure 2A:
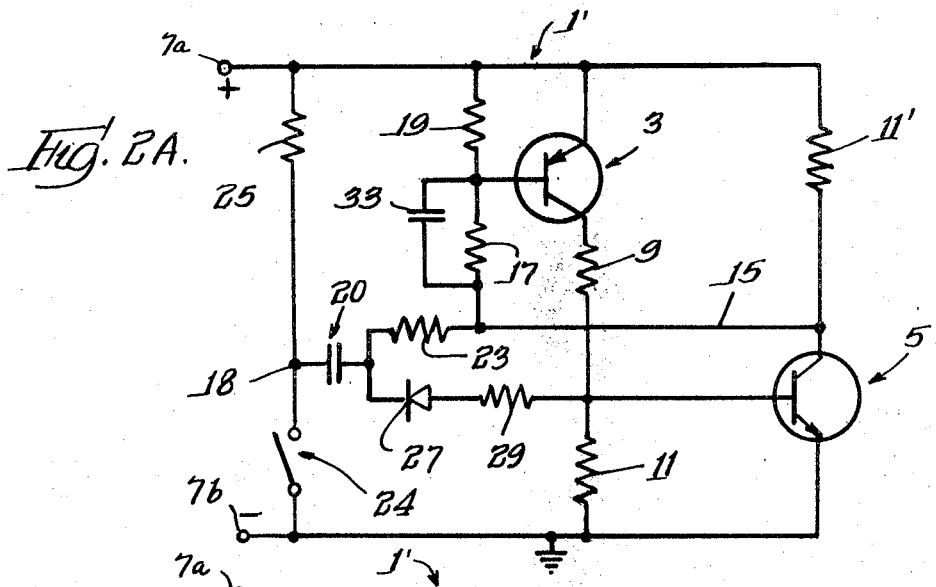
FIG. 2A is a modified bistable circuit of the invention where the relay coil load of FIG. 1A has been replaced by a resistive load, and other changes have been made in the circuit to compensate for the omission of a relay coil.
Figure 2B:
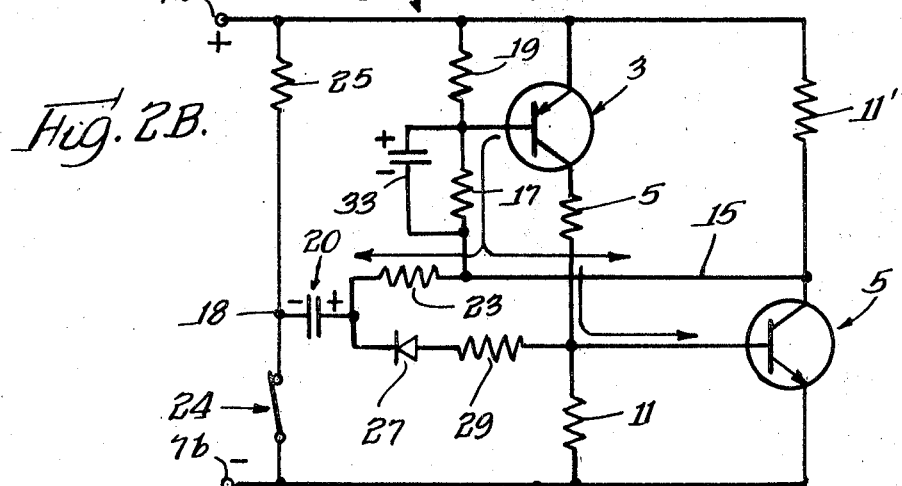
FIG. 2B shows the transient currents flowing in the circuit of FIG. 2A when a control signal is first applied to the input of the circuit.
Figure 2C:
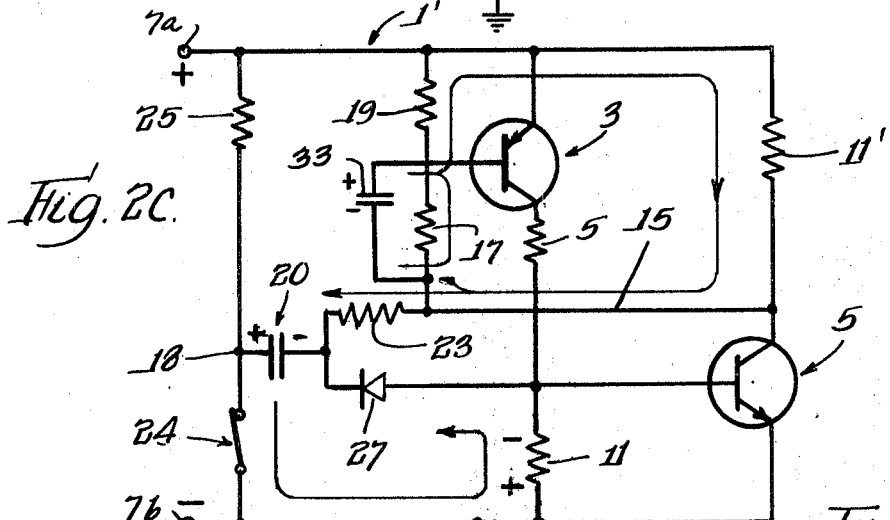
FIG. 2C shows the transient circuits flowing in the circuit of FIG. 2A at the instant the second control signal is applied to the input of the circuit.

Exemplary values for many of the circuit parameters in FIG. 1A are as follows:

Resistor 25—100 ohs
Capacitor 20—0.22 microfarad
Resistor 23—10,000 ohms
Resistor 17—5,000 ohms
Resistor 19—5,000 ohms
Resistor 29—3,300 ohms
Resistor 9—10,000 ohms
Resistor 11—10,000 ohms
Relay Coil 11a—Resistance 300 ohms, inductance 2.4 minimum millihenries Refer more particularly to the modified circuit 1' of FIGS. 2A. 2B and 2C which is a circuit substantially similar to the circuit of FIG. 1A except that the relay coil 11a is replaced by a resistor 11' and the resistor 7 connected to the base 3b of the transistor 3 is shunted by a capacitor 33. The circuit operates substantially the same as does the circuit of FIG. 1A when the switch 24 is momentarily closed to trigger the circuit into its conductive state. FIG. 2B illustrates the transient current flow during the triggering of the circuit into its conductive state. Upon the opening of the switch 24, capacitor 33 will charge up to a voltage approximately equal to the D.C. voltage across the voltage source terminals 7a and 7b less the base-emitter voltage of transistor 3 and the collector-emitter voltage of transistor 5. As will appear, the capacitor 33 serves the same function as the inductive load 11a in the embodiment of the invention shown in FIG. 1A, namely, that of preventing the charging of the capacitor 20 through the resistors 17 and 19 during the second closure of the switch 24 during a turn-off operation. During such second closure of the switch 24, the resulting cessation of current flow through the transistor 5 will cause the capacitor 33 to discharge to zero, since the opposite plates of the capacitor 33 are connected to the positive voltage source terminal 7a. This discharge current flow through resistor 19 in a direction which produces a voltage which will render the transistor 3 non-conductive and maintain the same non-conductive for a sufficient length of time that the capacitor 20 will substantially fully charge through a circuit path including the resistor 11'.

The circuits of FIGS. 1A and 2A, as indicated, circuits having two stable states of operation where either the transistors 3 and 5 both are conducting or are both non-conducting. Refer now to FIGS. 3A and 3B which illustrate a modified circuit 1" of FIG. 1A which is a monostable circuit where the circuit has only one stable state, namely, the state where the transistors 3 and 5 are in their non-conductive states. Thus, when the switch 24 is momentarily closed for the first time, the transistors 3 and 5 will be rendered conductive in the same way described in connection with the circuit of FIG. 1A. However, this conductive state will last only for a limited time period after which the circuit will revert to its non-conductive state. The means for converting the circuit of FIG. 1A from a bistable to a monostable circuit is a capacitor 37 which is placed in series between the resistor 17 connected to the base 3b of the transistor 3 and the conductor 15 connected to the collector 5c of the transistor 5. When the switch 24 is initially closed, the capacitors 20 and 37, which are connected in series in the same capacitor charging circuit, start to charge to a voltage depending upon the ratios of the capacitors. The capacitor charge current, will, as in the circuit of FIG. 1A, supply a drive voltage and current to the base 3b of the transistor 3 to initiate the conduction thereof. Current flow in the transistor 3 renders the transistor 5 conductive due to the drive voltage developed across the load resistor 11. When the capacitor 37 becomes substantially fully charged, the capacitor will then act as a simple open circuit for the base circuit of the transistor 3, so that the transistor 3 will then be rendered non-conductive. When the transistor 3 becomes non-conductive, the transistor 5 loses its drive power and likewise becomes non-conductive.

To prevent the generation of excessive voltages across the inductive load 11a when transistor 5 becomes non-conductive, the circuit of FIG. 3A utilizes a resistor 38 connected in series with a rectifier 40 across the inductive load 11a. When the transistor 5 becomes non-conductive, the rectifier 40 and the resistor 38 forms an alternate path for flow of current in the inductive load 11A.

If desired, the circuit of FIG. 3A can be operated to its non-conductive state before the capacitor 37 has become fully charged by the operation of the switch 24 which establishes a discharge path for the capacitor 20, as in the circuit of FIG. 1A. For this operation of the circuit, the resistor 38 provides only a partial path for the current flow through the inductive load 11a the remainder of the current flowing through the base circuit of the transistor 3 to keep the transistor 3 in a non-conductive state as previously explained in connection with FIG. 1A.

It should be understood that numerous modifications may be made in the most preferred forms of the invention described above without deviating from the broader aspects thereof.

I claim:

1. In a circuit comprising first and second complementary transistors each having a base terminal and emitter and collector load terminals, a source of D.C. voltage having first and second voltage output terminals across which a D.C. voltage appears, means connecting the load terminals of the transistors in separate parallel branch circuits which are connected across said voltage output terminals, means coupling the base terminal of each transistor to a load terminal of the other of same wherein the triggering into conduction of said first transistor will generate a turn-on voltage fed to the second transistor which becomes conductive and sustains conduction of the first transistor and the triggering of said second transistor into non-conduction will generate a turnoff voltage which will render the first transistor non-conductive, the improvement in a control circuit for controlling the conduction of said transistors in response to the momentary closure of switch means connected across an input terminal and a point coupled to said second voltage output terminal of said source of D.C. voltage, said control circuit comprising: a capacitor, first circuit-forming means connecting said capacitor in a circuit between said input terminal and said first terminal of said source of D.C. voltage for charging the capacitor during momentary closure of said switch means, said first circuit-forming means including a connection to the base terminal of said first transistor wherein drive power is supplied thereto by the capacitor charging current to trigger said first transistor into a conductive condition, and second circuit-forming means for effecting the discharge and reverse charging of said capacitor upon the reopening of said switch means, said second circuit-forming means including control impedance means coupled between the plate of the capacitor nearest said input terminal and said first voltage output terminal of said source of D.C. voltage, and means coupling the other plate of the capacitor to the load terminal of said second transistor which is remote from said second voltage output terminal.

2. The circuit of claim 1 wherein the first and second transistors are interconnected to form a bistable circuit, the transistors are successively switched to simultaneously conducting and simultaneously non-conducting states upon successive momentary closure of said switch means, and there is provided third circuit-forming means which connect said capacitor in a loop circuit including said switch means for effecting the discharge of said reversely charged capacitor upon the momentary closure of said switch means when the transistors are conducting, said third circuit-forming means including second control impedance means through which the capacitor discharge current flows during said last mentioned discharging thereof, and means for coupling the voltage drop across the latter control impedance means to the base terminal of said second transistor to trigger the same into non-conduction.

3. The circuit of claim 2 wherein said third circuit-forming means includes rectifier means for isolating the base of said second transistor from said first voltage output terminal of said source of D.C. voltage when said second transistor is not conducting.

4. The circuit of claim 1 wherein said transistors are interconnected to form a monostable circuit where the transistors are in their stable states when non-conductive, and there is provided means for enabling said transistors to remain conductive for only a limited period comprising a series capacitor forming part of said first circuit-forming means which series capacitor is connected between the base of said first transistor and the load terminal of said second transistor remote from said second voltage output terminal of said source of D.C. voltage to interrupt drive current flow to the first transistor when the capacitor becomes fully charged.

5. In a circuit comprsiing first and second complementary transistors having a base terminal, and emitter and collector load terminals; a source of D.C. voltage having first and second voltage output terminals across which a D.C. voltage appears; first load impedance means; second load impedance means; means for connecting the load terminals of said first transistor and said first load impedance means in series in the order named between first and second voltage output terminals of said source of D.C. voltage; means for connecting said second load impedance means and the load terminals of said second transistor in series in the order named between said first and second voltage terminals of said source of D.C. voltage; means for connecting said first load impedance means to the base terminal of said second transistor for effecting conduction of said second transistor when current flows through the terminals of said first transistor and the first load impedance means; and means coupling the base terminal of said first transistor to the load terminal of the second transistor remote from said second voltage output terminal for rendering said first transistor non-conductive when the second transistor is rendered non-conductive and for maintaining conduction of said first transistor by supplying a path for drive current therefor, the improvement in a control circuit for controlling the conduction of the transistors in response to a momentary uni-polarity input signals fed to an input terminal as by a first momentary closure of switch means coupled between said input terminal and said second voltage output terminal of said source of D.C. voltage; said control circuit comprising: a capacitor having a first plate coupled to said input terminal, first circuit-forming means coupling the other plate of said capacitor to said first output voltage terminal of said source of D.C. voltage for effecting the charge of said capacitor upon initial closure of said switch means, said first circuit forming means including a connection to the base terminal of said first transistor wherein drive power is supplied thereto by the capacitor charging current to trigger said first transistor into a conductive condition; and second circuit-forming means for effecting first the discharge and then the reverse charging thereof to a voltage of opposite polarity upon cessation of said first momentary closure of said switch means where said transistors are triggered into conduction; said second circuit-forming means including control impedance means coupled between said input terminal and said first voltage output terminal of said source of D.C. voltage, and means coupling the other plate of said capacitor to the load terminal of said second transistor remote from said first voltage output terminal of said source of D.C. voltage.

6. In a circuit comprising first and second complementary transistors each having a base terminal and collector and emitter load terminals, a source of D.C. voltage having first and second voltage output terminals across which a D.C. voltage appears; first load impedance means; second load impedance means; means for connecting the load terminals of said first transistor and said first load impedance means in series in the order named between said first and second voltage output terminals of said source of D.C. voltage; means for connecting said second load impedance means and the load terminals of said second transistor in series in the order named between said first and second voltage terminals of said source of D.C. voltage; means for connecting said first load impedance means to the base terminal of said second transistor for effecting conduction of said second transistor when current flows through the terminals of said first transistor and the first load impedance means; and means coupling the base terminal of said first transistor to the load terminal of the second transistor remote from said second voltage output terminal for rendering said first transistor non-conductive when the second transistor is rendered non-conductive and for maintaining conduction of said first transistor by supplying a path for drive current therefor, the improvement in a control circuit for controlling the conduction of said transistors, said control circuit comprising: first switch means operable momentarily from a normal condition to an operating condition; a capacitor; control impedance means; first capacitor charge circuit-forming means connecting said switch means, capacitor and control impedance means in a circuit between said voltage output terminals of said source of D.C. voltage for charging said capacitor when said switch means is first momentarily operated to said operating condition; means coupling the voltage across said control impedance means during the charging of said capacitor therethrough to the emitter and base of said first transistor to trigger the same into conduction; first capacitor discharge circuit-forming means coupled to said capacitor for effecting the discharge and reverse charging of said capacitor when said momentarily operated switch means returns to said normal condition; means responsive to a second momentary operation of said switch means to said operating condition when the transistors are in conduction to render said second transistor non-conductive; and means for preventing the flow of capacitor charge current through said control impedance means upon said second operation of said switch means to said operating condition to prevent the coupling of a turn-on voltage to the base of said first transistor when said second transistor becomes non-conductive.

7. The circuit of claim 6 wherein said last mentioned means comprises an inductance forming part of said second load impedance means of said second transistor which inductance, upon interruption of current flow through said second transistor, generates a voltage which causes current to flow through said control impedance means in the reverse direction to said capacitor charge current until said capacitor becomes substantially fully charged through an alternate path.

8. The circuit of claim 7 wherein the inductance forms part of a path for charging said capacitor.

9. The circuit of claim 6 wherein said last mentioned means comprises an unbypassed capacitor coupled between the base terminal of said first transistor and the load terminal of said second transistor remote from said second voltage output terminal of said source of D.C. voltage which capacitor fully charges when said second transistor is triggered into conduction and discharges when said second transistor becomes non-conductive to apply a turn-off voltage to the base of said first transistor.

References Cited

UNITED STATES PATENTS 3,409,736   11/1918   Nemeth _____ 307—288 X

JOHN S. HEYMAN, Primary Examiner

R. C. WOODBRIDGE, Assistant Examiner

U.S. Cl. X.R.

307—273, 313